United States Patent [19]

Davis

[11] 4,435,477

[45] Mar. 6, 1984

[54] RUBBER COMPOSITIONS AND ARTICLES THEREOF HAVING IMPROVED METAL ADHESION AND METAL ADHESION RETENTION

[75] Inventor: James A. Davis, Uniontown, Ohio

[73] Assignee: The Firestone Tire & Rubber Company, Akron, Ohio

[21] Appl. No.: 517,093

[22] Filed: Jul. 25, 1983

[51] Int. Cl.$^3$ .................... B32B 15/06; C08L 93/04; B60C 9/16

[52] U.S. Cl. .................................. 428/462; 156/124; 428/465; 428/497; 524/274

[58] Field of Search ................. 156/124; 428/256, 462, 428/465, 497; 524/274

[56] References Cited

U.S. PATENT DOCUMENTS

| | | | |
|---|---|---|---|
| 2,912,355 | 11/1959 | Formanek et al. | 428/465 |
| 3,897,583 | 7/1975 | Bellamy | 428/256 |
| 4,076,668 | 2/1978 | Kaneda et al. | 523/200 |
| 4,146,513 | 3/1979 | Weaver et al. | 523/200 |
| 4,148,769 | 3/1979 | Swarts et al. | 524/396 |
| 4,258,770 | 3/1981 | Davis et al. | 156/124 |
| 4,324,281 | 4/1982 | Ravagnani et al. | 428/462 |
| 4,324,710 | 4/1982 | Davis et al. | 524/274 |

FOREIGN PATENT DOCUMENTS

125228 12/1967 Czechoslovakia .
2060650 5/1981 United Kingdom .

*Primary Examiner*—William J. Van Balen
*Attorney, Agent, or Firm*—Daniel N. Hall

[57] ABSTRACT

Rubber compositions and metal-reinforced rubber ply members have improved metal adhesion and metal adhesion retention to brass and brass-plated metallic reinforcement. The improvement comprises admixing from about 0.5 to about 12.5 parts per hundred rubber (phr) of an organic salt of nickel and at least about 3.0 phr of a thermoplastic resin derived from crude wood rosin containing carboxylic acid groups or carboxylic acid ester groups with a vulcanizable rubber composition prior to embedding the metallic reinforcement therein and curing. A method for improving the metal adhesion and metal adhesion retention between a vulcanizable rubber and brass or brass-plated metallic reinforcement includes the steps of dispersing from about 0.5 to about 12.5 phr of an organic salt of nickel in a vulcanizable rubber composition and dispersing at least about 3.0 phr of the aforementioned thermoplastic resin in the same rubber composition prior to curing.

25 Claims, No Drawings

RUBBER COMPOSITIONS AND ARTICLES THEREOF HAVING IMPROVED METAL ADHESION AND METAL ADHESION RETENTION

TECHNICAL FIELD

The present invention is directed toward improving the adhesion and adhesion retention between a rubber composition, used in the manufacture of tires, conveyor belts, hoses and the like, and metallic reinforcement cord, such as steel wire and cable which commonly carries a protective coating of zinc or brass and is embedded in the stock. Flat sheets or strips of such stocks, reinforced with metal or fibers, are utilized as plies or other components of the article and are referred to in the art as rubber skim stocks. Skim refers to a relatively thin layer or coating of the rubber over the reinforcement filaments or cords. Greater thicknesses of rubber are also bonded to metal in other instances such as motor mounts and these would not be termed skim stocks.

In the manufacture of the foregoing rubber articles, particularly steel-belted bias and radial tires, it has become common to reinforce the rubber skim stock material with steel wire or cable. One of the more important uses for a metallic reinforced rubber is as a belt where one or more of these belts are substantially circumferentially oriented beneath the tread stock to maintain the integrity and shape of the tire during inflation and subsequent load. Other areas where metal reinforced rubber skim stock may be utilized is in the body ply, bead or chafer of a tire.

In order for these components to function effectively, it is imperative that adhesion between the rubber and the steel cord be effectively maintained. Because steel is prone to oxidation, which even in minor degree is highly deleterious to the necessary adhesion with the rubber skim stock, often it is impractical to incorporate a chemically clean, oxidation-free steel cord in the belt at the time of its manufacture, the steel cord is plated with zinc or brass thereby protecting it from oxidation until it can be used.

While adhesion between zinc or brass-plated steel cord and rubber is generally far greater than that between the latter and oxidized steel, existing data determined from article life as well as modern testing techniques indicates the desirability of adding materials to rubber to improve article life and service through increased adhesion and adhesion retention. Improved adhesion between rubber and brass or the rubber skim stock and brass-plated steel is obtained according to the present invention.

BACKGROUND ART

In order to promote adhesion between rubber and ferrous metals it is known to employ a variety of metallic salts as coatings to the metal or as an ingredient in a rubber composition. It is also known to add various resins as tackifiers and/or adhesion promoters and, in other instances, to employ both a metal salt and a resin. Typical of the first type of art is U.S. Pat. No. 2,912,355 which is directed toward improving the adhesion between rubber and metal by the incorporation into a rubber composition of a calcined, partially oxidized metal salt of an aliphatic fatty acid compound, the metal being cobalt, copper, iron, lead, mercury, nickel or silver.

The use of resins alone in rubber compounds is disclosed in U.S. Pat. No. 4,146,513 which provides a modified phenolic resin which is employed as a tackifier in natural/synthetic rubber stocks where natural building tack has been decreased due to the presence of the synthetic rubber. The patent also reports improved static adhesion between the rubber and reinforcement filaments, such as brass-coated steel wire, when the tackifier resin of the invention is employed.

Finally, patents which disclose the use of both metal salts and resins include U.S. Pat. No. 3,897,583 which is directed toward the adhesion of metal to rubber by incorporating a cobalt salt in a rubber stock which contains an adhesive resin forming system based on methylene donor which is a methylolated nitroalkane in combination with a resorcinol type methylene acceptor. Cobalt salts disclosed include those of aliphatic or alicyclic carboxylic acids having 6–30 carbon atoms.

U.S. Pat. No. 4,076,668 discloses the use of cobalt salts of organic acids, the latter having between 6 and 30 carbon atoms with a monohydroxybenzoic acid component in natural and/or synthetic rubber in order to improve the adhesion between the rubber composition and a variety of reinforcements including plated steel cord. The patent further discloses that the adhesive properties of the rubber composition with fibrous materials, e.g., nylon, Aramid and the like, can be improved along with moisture resistance by the addition of an alkylphenol type resin or cresolformaldehyde type resin.

U.S. Pat. No. 4,148,769 is directed toward a sulfur-containing rubber composition having improved adhesion with brass-plated steel cords comprising, as unconventional ingredients, litharge and a cobalt salt of a fatty acid. The patentees further state that adhesive strength is improved by the addition of resorcinol, or a prereacted soluble resorcinol resin. Resorcinol resin has long been known to increase the adhesion between rubber and brass. The data in the patent indicates that even more satisfactory results are obtained when the cobalt salt, litharge and resorcinol are incorporated together in the rubber composition.

A final U.S. Pat. No. 4,258,770, owned by the common Assignee, is directed toward the use of certain inorganic salts of cobalt or nickel in combination with a rosin-derived resin as additives to a vulcanizable rubber. Improved rubber to metal adhesion and adhesion retention between the rubber and plated steel cord is reported.

A 1967 Czechoslovakian Pat. No. 125,228 discloses closes the addition of cobalt propionate as an adhesive for improving the adhesion between unplated metal and synthetic or natural rubber stocks. The composition of the rubber stock also includes a quantity of pine tar.

United Kingdom application No. 2,060,650, filed by Pirelli and published May 7, 1981 discloses a method for bonding elastomers to ferrous metal, particularly brass-plated steel. The method is practiced by adding a quantity of nickel abietate which is described as the salt of nickel and colophony, the latter consisting of 98 percent abietic acid. The elastomeric stocks tested also contained quantities of resorcinol and hexamethylene tetramine as bonding agents and thus, no adhesion values were presented for the nickel/colophony salt addition alone without the two aforementioned bonding agents.

While others have sought to enhance adhesion between rubber compositions and metals by employing various combinations of cobalt and other metal salts with resins, the art of which has been presented herein has not disclosed the exclusive use of an organic salt of nickel with a thermoplastic resin derived from crude wood rosin to increase adhesion properties between rubber and brass-plated metallic reinforcement.

DISCLOSURE OF INVENTION

The present invention provides a vulcanizable rubber composition having improved metal adhesion and metal adhesion retention properties with brass and brass-plated metallic reinforcing elements when cured, i.e., vulcanized, by incorporating prior to curing from about 0.5 to about 12.5 parts by weight of an organic salt of nickel per 100 parts of the rubber component in the rubber composition and at least about 3.0 parts by weight of a thermoplastic resin derived from crude wood rosin containing carboxylic acid groups or carboxylic acid ester groups per 100 parts of the rubber component in the rubber composition.

The present invention further provides a metal-reinforced rubber ply to be used as a component in the construction of a manufactured rubber article such as a tire, the ply having a rubber composition and a brass-plated element bonded thereto wherein the rubber composition comprises from about 0.5 to about 12.5 parts by weight of an organic salt of nickel per 100 parts of the rubber component of the rubber composition and at least about 3.0 parts by weight of a thermoplastic resin derived from crude wood rosin containing carboxylic acid groups or carboxylic acid ester groups per 100 parts of the rubber component in the rubber composition.

In the manufacture of rubber articles such as tires, several structural components are employed. Some of the structural rubber components found in a typical tire, often as one or more layers, include a tread ply skim, body ply skim, bead filler, innerliner, sidewall, stabilizer ply insert, toe filler, chafer, undertread, tread, and the like. Many of these rubber ply components can be reinforced with steel wire or cable and it is important that the bond between the rubber and the reinforcing filaments be strong.

Still further, the present invention provides a method of improving metal adhesion and metal adhesion retention properties between a vulcanizable rubber composition and brass or brass-plated metallic reinforcing elements when cured including the steps of dispersing from about 0.5 to about 12.5 parts by weight of an organic salt of nickel per 100 parts of the rubber component in the rubber composition and dispersing at least about 3.0 parts by weight of a thermoplastic resin derived from crude wood rosin containing carboxylic acid groups or carboxylic acid ester groups per 100 parts of the rubber component in the rubber composition prior to curing.

In addition to improved adhesion, the present invention also provides improved 100° C. tear strength. As will be explained hereinbelow, use of only the nickel salt reduces tear strength over a control composition containing neither component of the present invention. However, when the resin is also added, acceptable tear strength results.

PREFERRED MODE FOR CARRYING OUT THE INVENTION

To illustrate the invention, a typical example of a rubber composition with metallic reinforcement embedded therein was chosen. In particular, the example used to demonstrate the invention was a rubber skim stock which is suitable for the preparation of rubber articles such as tires. Adhesion between this stock with brass-plated steel reinforcement subsequent to vulcanization was measured and has also been presented hereinbelow.

The polymer portion of the rubber composition used in the following examples comprised 100 parts by weight of natural rubber. Polymer type, here, is not deemed to be a limitation to the practice of the instant invention. Natural rubber may also be employed in a blended state with one or more synthetic rubbers such as styrene-butadiene, synthetic isoprene or other synthetic rubbers with a natural rubber content of at least 40 to 50 percent. Further, pure forms of synthetic rubbers such as those disclosed may be used either alone or blended with other synthetic rubbers.

An ingredient utilized in the practice of the present invention includes an organic salt of nickel with aliphatic and aromatic carboxylic acids, having from one to about 22 carbon atoms. The salts are prepared by the combination of nickel hydroxide or hydrate and the carboxylic acid. Suitable monocarboxylic acids used to practice the present invention would be preferably, acetic, propionic, butyric, valeric, octanoic, undecanoic, lauric, palmitic, stearic, nonadecanoic, benzoic and the like. A preferred organic salt of nickel is nickel octoate which was employed in the experimental work discussed hereinbelow. It can be prepared from octanoic acid and nickel hydrate. Nickel octoate is a light green powder having between about 14.8 and 17 percent nickel, a specific gravity of 1.19 at 23° C. and a moisture content of 4.05 percent.

Nickel octoate and others of the salts disclosed herein can contain moisture resulting from preparation and/or the atmosphere. While the salt can be dried according to known methods in the art to remove any water of hydration or other moisture, it is desirable that the salt be uncalcined as well as unoxidized during drying or before use in the present invention inasmuch as independent tests run in the laboratory of the Assignee of record with calcined salts of monocarboxylic acids have established that a decrease in adhesion properties resulted in instances where the metal salt, per se, was employed to improve adhesion.

Suitable dicarboxylic acids include both aliphatic and aromatic acids having from two to about 22 carbon atoms. These include acids such as oxalic, malonic, maleic, succinic, glutaric, adipic, pimelic, suberic, azelaic, sebacic, phthalic, isophthalic, terephthalic, homophthalic, o,m and p-phenylenediacetic and o-phenyleneacetic-betapropionic acid. It is desirable that none of these salts be used in their uncalcined and unoxidized form as explained hereinabove.

Amounts of the nickel salt employed can range from about 0.5 to about 12.5 parts per hundred parts of rubber (phr) with 0.5 to 5.0 phr and specifically 2.06 phr being preferred.

With respect to the thermoplastic resin, resins derived from crude wood rosin containing either carboxylic acid groups or carboxylic acid ester groups are employed. These resins are naturally occurring thermoplastics that are non-elastomeric and they are insoluble in aliphatic hydrocarbons. Two Hercules products, Vinsol and Pamak, have been found to be particularly effective with nickel octoate in promoting adhesion between rubber skim stocks containing these additives and brass. Vinsol, an extractable material from pine wood, is a registered trademark of Hercules, Inc. for a series of low-cost, dark, brittle thermoplastic resins. Pamak is a registered trademark of Hercules, Inc. for various tall oil products including a series of tall oil fatty acids and distilled tall oils containing varying percentages of rosin acids.

Vinsol is the resin which contains carboxylic acid groups and according to information supplied by Hercules, Vinsol is taken from aliphatic hydrocarbon-insoluble solids of pine wood extract and is a complex mixture of many components. It contains acidic materials derived from resin acids and oxidized resin acids as well as high molecular weight neutral compounds such as polymerized terpenes and natural waxes. Over one-half of Vinsol is comprised of constituents which are phenolic in character, particularly phlobaphenes, giving it its dark color. Vinsol also contains a neutral fraction and a rosin-derived fraction. In addition to carboxyl and phenolic groups, there are other reactive groups containing double bonds and active hydrogens.

Hercules' literature provides that the phenolic fraction contains by weight approximately 24 percent of phlobaphenes, 11 percent of carboxylated phlobaphenes, 9 percent of substituted stilbenes, 7 percent of lignan hydroxy lactone, 4 percent of flavanoid compounds, and 2 percent of a lignin-type material; the neutral fraction contains by weight approximately 5 percent of wax, 9 percent of polymerized terpenes, and 1 percent of dimethoxystilbene; and the rosin-derived fraction contains by weight approximately 17 percent of resin acids, 1 percent of oxidized resin acids, and 10 percent of polymerized resin acids.

Among some of Vinsol's chemical properties, also determined by Hercules, are the following: acid number 95; hydroxyl content by acetylation 5.5%; methoxyl content (ASTM) 5.1%; molecular weight (average) 495; and pH of a water-alcohol solution 4.7. Physical properties include: dark-colored, ruby red by transmitted light and dark brown by reflected light; density at 25° C., 1.220; and, softening point (Hercules drop method) 120° C. Further specifics can most likely be obtained directly from Hercules, Inc. and have been disclosed in U.S. Pat. No. 4,324,710, owned by the Assignee of record, the subject matter of which is incorporated herein by reference.

Pamak TP is the resin which contains carboxylic acid ester groups and according to information supplied by Hercules, Pamak TP is a naturally occurring, low softening thermoplastic resin of low acid number.

More specifically, these resins may be dark, tacky, viscous liquids derived from wood pulp used in the manufacture of paper. Such pulp is made by dissolving the lignin in hot solutions of (1) sodium hydroxide, (2) calcium, magnesium or ammonium bisulfite, or (3) a mixture of sodium hydroxide and sodium sulfide (made from lime and reduced sodium sulfate). Pulp treated by the above process (sulfate process) yields, for each ton of paper, about 50 pounds of crude tall oil, which consists of about 50 percent unsaturated fatty acids, chiefly oleic and linoleic acids, and about 50 percent of a rosin acid mixture. The bulk of the fatty acids are removed from the crude tall oil by fractionation. The bottoms remaining after the fatty acid fractionation represent the material from which the resins employed in this invention are derived.

Pamak TP resin is commerically available generally as a liquid having a viscosity of about 3520 SUS at 100° C. and a specific gravity of about 1.007 at 25° C. Pamak resins can have softening points of approximately 35° to 80° C. (Hercules drop method), acid numbers of about 20 to 40, typically about 20 to 35, and are soluble in acetone, terpene solvents, benzene, ether and chlorinated hydrocarbons. As noted hereinabove, these resins further contain esterified carboxylic acid groups and can be characterized by having about 15 to 30 percent unsaponifiables, 3 to 20 percent rosin acids, 3 to 15 percent fatty acids and 5 to 15 percent sterols. The acids and sterols can be in ester or free form in the original, unsaponified resin. The ash content of these resins is typically about 0.3 to 1 percent. Further specifics can likely be obtained from Hercules, Inc. and have been disclosed in an allowed copending application, U.S. Ser. No. 359,739, owned by the Assignee of record, the subject matter of which is incorporated herein by reference.

For purposes of this disclosure, these resins are occasionally referred to as a rosin-derived resin. It is to be understood that Vinsol and Pamak are two commercially available resins that have been found to be satisfactory; however, these resins are not necessarily specific to the exclusion of others as it is believed that other resin products having similar properties and components could be substituted for Vinsol or Pamak to improve adhesion of rubber skim stocks and metal. Amounts of the resin that can be employed effectively are at least about 3.0 phr and preferably from about 3.0 to about 6.0 phr although greater amounts are not to be precluded.

In order to determine the improvement in adhesion obtained when a nickel salt and a rosin-derived resin are added to the rubber skim stock, T-adhesion tests (rubber-steel cord) were conducted.

The test utilized T-adhesion pads prepared by placing 60 gauge sheets of uncured fully compounded rubber skim stock on 51 gauge fabric reinforced rubber backing. Commercial brass-coated wires (1×5×0.25 mm diam.) were placed between two pads of the reinforced skim stock with the wires in contact with the uncured rubber skim at 1.25 cm. intervals. The width of each adhesion pad was 1.25 cm. The pads were placed in a mold and were cured for 38 minutes at 149° C. Testing was done on a Model 1130 Instron Universal Tester at a crosshead speed of 25.4 cm per minute with samples preheated for 20 minutes at 110° C. prior to testing. Oven aging of the cured T-adhesion pads was done in a forced air oven at 121° C. for two days. Oxygen bomb aging of the cured samples was done in a pressure tight bomb for 48 hours at 70° C., in a 100 percent oxygen atmosphere.

DETAILED T-ADHESION TEST PROCEDURE

1. Using a Clicker machine and a 15.24×1.25 cm die, prepare an adequate number of calendered and control stock samples for T-adhesion pad building.
2. Use one piece of calendered fabric reinforced rubber backing (0.1295 cm).
3. Ply one piece of 60 gauge control rubber skim stock (0.1524 cm) onto the fabric backing.
4. Place sample in building jig with fabric side down.
5. Place ten cords (of brass or zinc coated wire) approximately 17.78 cm in length equally spaced on top of the two piece assembly.
6. Invert another 2 ply assembly, made as in items 1, 2 and 3, on top of cords so that cords are between the 2 layers of rubber skim stock to be tested.

7. This assembly should now fit snugly into the cavity of the curing mold.
8. Adhesion pads shall be cured for 38 minutes at 149° C. and then allowed to equilibrate for 24 hours before testing.
9. Testing Machine: Model 1130 Instron Universal Tester.
10. Test speed 25.4 cm/minute; testing temperature, 110° C. after 20 minutes preheat.
11. The top grip shall be of a special holder made for the cured sample, with a slot in the bottom to permit the sample to be inserted with the wires protruding. The bottom grip should be a wedge type, designed to exert increasing tightening as each wire is pulled from the cured sample.
12. Record 10 wire pull-outs and average. Multiply average pull-out force value by 0.3572 to obtain kilograms per centimeter.

In the tests which follow, a rubber skim stock, composition A, was prepared which did not contain the adhesion promoting ingredients of the present invention. Rubber compositions B-E were prepared exactly as was composition A except that they contained 0.60 phr of NOBS special accelerator and rosin-derived resin and nickel octoate according to the present invention. Formulations for each are as follows with all parts given on the basis of parts per hundred parts of rubber (phr) by weight.

| Compounding Ingredients | Composition A |
| --- | --- |
| Natural Rubber (E grade) | 100 |
| HAF Black | 50 |
| Zinc Oxide | 8.0 |
| Stearic Acid | 0.50 |
| Santoflex DD[1] | 1.0 |
| Naphthenic process oil | 2.0 |
| NOBS Special accelerator[2] | 0.70 |
| Santoflex 13[3] | 1.0 |
| Sulfur MB[4] | 6.25-7.50 |

[1] 6-dodecyl-1,2-dihydro-2,2,4-trimethylquinoline
[2] N—oxydiethylene benzothiazole-2-sulfenamide (NOBS Special accelerator)
[3] N—(1,3-dimethylbutyl)-N'—phenyl-p-phenylene-diamine
[4] 80/20 sulfur/extender oil preblend, with a naphthenic oil in the range of 18-22% oil. The sulfur is a yellow powder, 89.5% min. of which is insoluble sulfur.

It is to be understood that the foregoing composition of the rubber skim stock has been presented solely to enable those skilled in the art to have at least one rubber skim stock with which to practice the invention. As such, the present invention is not to be limited only to this specific formulation.

The five compositions were each used to build T-adhesion pads with brass-plated steel cord. Three sets of tests were conducted on each of the five stocks for comparison. Table I shows the results of the testing under normal, oven aged and oxygen aged conditions. The force necessary to pull or remove the metallic reinforcement from the vulcanized rubber skim stock is given first, in kg/cm, followed by the percent of rubber skim stock remaining on the surface of the metallic reinforcement. The amount of rubber skim stock remaining on the metallic reinforcement was determined by visual examination and has been reported as % rubber coverage.

TABLE I

| Short Term Aged Steelcord T-Adhesion Tests | | | | | |
| --- | --- | --- | --- | --- | --- |
| Rubber Compositions | A | B | C | D | E |
| Sulfur MB, phr | 7.50 | 7.50 | 7.50 | 6.25 | 6.25 |

TABLE I-continued

| Short Term Aged Steelcord T-Adhesion Tests | | | | | |
| --- | --- | --- | --- | --- | --- |
| Rubber Compositions | A | B | C | D | E |
| Nickel octoate, phr | — | 2.06 | 2.06 | 2.06 | 2.06 |
| Vinsol resin, phr | — | 3.0 | 6.0 | 3.0 | 6.0 |
| Test A Normal (Unaged)[a] Brass-plated cord | | | | | |
| Kg/cm | 26.1 | 32.1 | 31.5 | 31.5 | 30.9 |
| % rubber coverage | 80 | 100 | 100 | 100 | 100 |
| Test B Oven Aged[b] Brass-plated cord | | | | | |
| Kg/cm | 12.4 | 19.3 | 20.9 | 17.8 | 20.7 |
| % rubber coverage | 95 | 100 | 100 | 100 | 100 |
| Test C Oxygen Bomb Aged[c] Brass-plated cord | | | | | |
| Kg/cm | 14.2 | 26.3 | 24.6 | 26.4 | 22.9 |
| % rubber coverage | 45-50 | 100 | 100 | 100 | 95-100 |

[a] T-adhesion pads cured 38 minutes at 149° C. and tested at 110° C.
[b] T-adhesion pads cured 38 minutes at 149° C., heat aged in forced air oven for 2 days at 121° C. and tested at 110° C.
[c] T-adhesion pads cured 38 minutes at 149° C., aged in a 100 percent oxygen atmosphere for 48 hours at 70° C. and tested at 110° C.

As can be determined from Table I, Test A, adhesion of compositions B-E to brass-plated steel cord was significantly better than for composition A. Rubber compositions A, which contained neither the resin nor the nickel salt, showed lower adhesion values with 80 percent rubber coverage. As can be seen from Test B, compositions B-E showed significantly greater adhesion and exhibited excellent coverage and, therefore, superior rubber to metal adhesion over composition A.

Finally, the effect of oxygen exposure to the rubber-metal bond is presented in Test C. Oxygen, which commonly functions as an oxidizing agent has long been known by those skilled in the art to have deleterious effects on the chemical nature of the rubber to metal bonds whether they be zinc-sulfur or copper-sulfur bridges. Again, a significant improvement in adhesion and rubber coverage was observed for compositions B-E as compared with the control, composition A.

The rubber coverage measurement is deemed to be significant in that it visually represents the increased adhesion of the rubber composition to the plated steel cord. As is well known to those skilled in the art, the amount of rubber left adhering to the steel cord after it has been pulled from a cured T-adhesion pad represents the relationship of the adhesive force attaching the rubber composition to the surface of the steel cord and the tear strength of the rubber composition itself. Large percentages of rubber coverage indicate that the adhesion to the steel cord exceeds the internal strength of the rubber composition itself, i.e., tear strength. Therefore, when the rubber coverage is very high it can be concluded that the metal to rubber adhesion is greater than the force measured to pull the steel cord out of the rubber pad since the force measured was a result of the rubber composition rupturing and not the metal to rubber interface.

Normal or unaged testing is merely a measurement of the initial adhesive properties between the rubber composition and the metallic reinforcement. The oven aging test is an accelerated heat aging test and is significant in determining the effect of heat on the thermal stability of the chemical bonds formed between the rubber composition and the metallic reinforcement during vulcanization. The significance of oxygen bomb aging tests is to determine the chemical stability of chemical bonds formed between the rubber skim stock and the metallic reinforcement when exposed to conditions of high oxygen atmosphere and high temperature, as compared to ambient, and extended periods of time.

Based on the foregoing results reported in Table I, the presence of the rosin-derived resins set forth herein such as Vinsol or Pamak and a nickel salt such as nickel octoate in a rubber skim stock have been shown to be effective in promoting adhesion between the rubber skim stock and brass-plated metallic reinforcement. As stated hereinabove, the rubber can be natural or synthetic or a blend and formulated as a rubber stock or a skim stock. Also, the metallic reinforcement employed in the practice of the invention can be in the form of a strand, mat, web, ply or braid.

The addition of nickel octoate alone to composition A reduced 100° C. tear strength when compared to that property for the same composition A omitting any nickel salts. However, 100° C. tear strength was essentially restored when the rosin-derived resins disclosed herein were also incorporated. Tear strengths determined for compositions A-E were measured and found to be as follows: A-73.06 KN/m; B-61.69 KN/m; C-72.01 KN/m; D-66.15 KN/m; E-64.31 KN/m. In separate stocks containing only 2.06 phr of nickel octoate and no resin, tear strengths of 48.74 to 52.68 KN/m were obtained for sulfur levels of 7.5 and 6.25 phr, respectively. Thus, the addition of nickel octoate alone, lowered tear strength of composition A approximately 28 to 33 percent while the tear strengths of compositions B-E were restored to within acceptable ranges.

The present invention also finds utility in, for example, other rubber articles bonded to brass or brass-plated steel such as motor mounts, cutless bearings, torsilastic springs, power belts, printing rolls, metal wire reinforced or braided hose, electrical deicers, shoe heels and wherever it is desired to secure rubber to metal or provide a flexible and strong, thermally stable bond between the same.

In conclusion, it is to be understood that all methods and rubber compounds disclosed herein fall within the scope of the claimed invention and that the subject invention is not to be limited by the examples set forth herein. As will be apparent to those skilled in the art, the formulation of the rubber composition can be varied within the scope of the total specification disclosure by selection of various organic salts of nickel and rosin-derived thermoplastic resins of the type set forth herein as well as the amounts thereof, and it is believed that practice of the present invention can be determined without departing from the spirit of the invention herein disclosed and described, the scope of the invention being limited solely by the scope of the attached claims.

I claim:

1. A vulcanizable rubber composition having improved metal adhesion and metal adhesion retention properties with brass and brass-plated metallic reinforcing elements, the improvement wherein:
   from about 0.5 to about 12.5 parts by weight of an organic salt of nickel per 100 parts of the rubber component in said rubber composition; and
   at least about 3.0 parts by weight of a thermoplastic resin derived from crude wood rosin and containing carboxylic acid groups or carboxylic acid ester groups per 100 parts of the rubber component are incorporated into said rubber composition prior to curing.

2. A rubber composition as set forth in claim 1, wherein said salts of nickel are selected from the group consisting of organic salts of aliphatic and aromatic monocarboxylic acids having from one to about 22 carbon atoms and aliphatic and aromatic dicarboxylic acids having from two to about 22 carbon atoms.

3. A rubber composition as set forth in claim 2, wherein said organic salt of nickel is nickel octoate and the amount employed is 2.06 parts per 100 parts of rubber.

4. A rubber composition as set forth in claim 1, wherein said thermoplastic resin has a softening point of from about 110° C. to about 130° C., and an acid number of from about 40 to about 105.

5. A rubber composition as set forth in claim 4, wherein said thermoplastic resin contains a majority of a phenolic fraction, a neutral fraction, and a rosin derived fraction.

6. A rubber composition as set forth in claim 5, wherein said phenolic fraction contains by weight approximately 24 percent of phlobaphenes, 11 percent of carboxylated phlobaphenes, 9 percent of substituted stilbenes, 7 percent of lignan hydroxy lactone, 4 percent of flavanoid compounds, and 2 percent of a lignin-type material; wherein said neutral fraction contains by weight approximately 5 percent of wax, 9 percent of polymerized terpenes, and 1 percent of dimethoxystilbene; and wherein said rosin-derived fraction contains by weight approximately 17 percent of resin acids, 1 percent of oxidized resin acids, and 10 percent of polymerized resin acids.

7. A rubber composition as set forth in claim 1, wherein said thermoplastic resin has a softening point of from about 35° C. to about 80° C., and an acid number of about 20 to about 40.

8. A rubber composition as set forth in claim 7, wherein the resin contains a majority of a saponifiable fraction, an unsaponifiable fraction, a fatty acid fraction, a rosin acid fraction and sterols.

9. A rubber composition as set forth in claim 8, wherein the thermoplastic resin fraction contains about 15 to 30 percent unsaponifiables, 3 to 20 percent rosin acids, 3 to 15 percent fatty acids and 5 to 15 percent sterols.

10. A method for improving metal adhesion and metal adhesion retention properties between a vulcanizable rubber composition and brass or brass-plated metallic reinforcing elements comprising the steps of:
    dispersing from about 0.5 to about 12.5 parts by weight of an organic salt of nickel per 100 parts of the rubber component in said rubber composition; and
    dispersing at least about 3.0 parts by weight of a thermoplastic resin derived from crude wood rosin and containing carboxylic acid groups or carboxylic acid ester groups per 100 parts of the rubber component in said rubber composition prior to curing.

11. A method as set forth in claim 10, wherein said salts of nickel are selected from the group consisting of organic salts of aliphatic and aromatic monocarboxylic acids having from one to about 22 carbon atoms and aliphatic and aromatic dicarboxylic acids having from two to about 22 carbon atoms.

12. A method as set forth in claim 11, wherein said organic salt of nickel is nickel octoate and the amount employed is 2.06 parts per 100 parts of rubber.

13. A method as set forth in claim 10, wherein said thermoplastic resin has a softening point of from about 110° C. to about 130° C., and an acid number of from about 40 to 105.

14. A method as set forth in claim 13, wherein said thermoplastic resin contains a majority of a phenolic fraction, a neutral fraction, and a rosin derived fraction.

15. A method as set forth in claim 14, wherein said phenolic fraction contains by weight approximately 24 percent of phlobaphenes, 11 percent of carboxylated phlobaphenes, 9 percent of substituted stilbenes, 7 pecent of lignan hydroxy lactone, 4 percent of flavanoid compounds, and 2 percent of a lignin-type material; wherein said neutral fraction contains by weight approximately 5 percent of wax, 9 percent of polymerized terpenes, and 1 percent of dimethoxystilbene; and wherein said rosin-derived fraction contains by weight approximately 17 percent of resin acids, 1 percent of oxidized resin acids, and 10 percent of polymerized resin acids.

16. A method as set forth in claim 10, wherein said thermoplastic resin has a softening point of from about 35° C. to about 80° C., and an acid number of about 20 to about 40.

17. A method as set forth in claim 16, wherein the resin contains a majority of a saponifiable fraction, an unsaponifiable fraction, a fatty acid fraction, a rosin-acid acid fraction and sterols.

18. A method as set forth in claim 17, wherein the thermoplastic resin fraction contains about 15 to 30 percent unsaponifiables, 3 to 20 percent rosin acids, 3 to 15 percent fatty acids and 5 to 15 percent sterols.

19. A metal-reinforced rubber ply to be used as an element in a manufactured rubber article, said ply having a rubber composition and a brass-plated element bonded thereto wherein said rubber composition is made by curing a composition comprising:
a vulcanizable rubber;
from about 0.5 to about 12.5 parts by weight of an organic salt of nickel per 100 parts of the rubber component in said rubber composition; and
at least about 3.0 parts by weight of a thermoplastic resin derived from crude wood rosin and containing carboxylic acid groups or carboxylic acid ester groups per 100 parts of the rubber component in said rubber composition.

20. A metal-reinforced rubber ply, as set forth in claim 19, wherein said salts of nickel are selected from the group consisting of organic salts of aliphatic and aromatic monocarboxylic acids having from one to about 22 carbon atoms and aliphatic and aromatic dicarboxylic acids having from two to about 22 carbon atoms.

21. A metal-reinforced rubber ply, as set forth in claim 20, wherein said organic salt of nickel is nickel octoate and the amount employed is 2.06 parts per 100 parts of rubber.

22. A metal-reinforced rubber ply, as set forth in claim 19, wherein said thermoplastic resin has a softening point of from about 110° C. to about 130° C., and an acid number of from about 40 to 105.

23. A metal-reinforced rubber ply, as set forth in claim 22, wherein said thermoplastic resin contains a majority of a phenolic fraction, a neutral fraction, and a rosin-derived fraction.

24. A metal-reinforced rubber ply, as set forth in claim 23, wherein said phenolic fraction contains by weight approximately 24 percent of phlobaphenes, 11 percent of carboxylated phlobaphenes, 9 percent of substituted stilbenes, 7 percent of lignan hydroxy lactone, 4 percent of flavanoid compounds, and 2 percent of a lignin-type material; wherein said neutral fraction contains by weight approximately 5 percent of wax, 9 percent of polymerized terpenes, and 1 percent of dimethoxystilbene; and wherein said rosin-derived fraction contains by weight approximately 17 percent of resin acids, 1 percent of oxidized resin acids, and 10 percent of polymerized resin acids.

25. A metal-reinforced rubber ply, as set forth in claim 19, wherein said thermoplastic resin has a softening point of from about 35° C. to about 80° C., and an acid number of about 20 to about 40.

26. A metal-reinforced rubber ply, as set forth in claim 25, wherein the resin contains a majority of a saponifiable fraction, an unsaponifiable fraction, a fatty acid fraction, a rosin acid fraction and sterols.

27. A metal-reinforced rubber ply, as set forth in claim 26, wherein the thermoplastic resin fraction contains about 15 to 30 percent unsaponifiables, 3 to 20 percent rosin acids, 3 to 15 percent fatty acids and 5 to 15 percent sterols.

* * * * *